(12) United States Patent
Jang et al.

(10) Patent No.: US 10,917,605 B2
(45) Date of Patent: Feb. 9, 2021

(54) DISPLAY DEVICE

(71) Applicant: SAMSUNG ELECTRONICS CO., LTD., Suwon-si (KR)

(72) Inventors: Du Hee Jang, Suwon-si (KR); Jeong Il Kang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/756,585

(22) PCT Filed: Nov. 12, 2018

(86) PCT No.: PCT/KR2018/013742
§ 371 (c)(1),
(2) Date: Apr. 16, 2020

(87) PCT Pub. No.: WO2019/093848
PCT Pub. Date: May 16, 2019

(65) Prior Publication Data
US 2020/0244918 A1  Jul. 30, 2020

(30) Foreign Application Priority Data

Nov. 13, 2017  (KR) .................... 10-2017-0150642

(51) Int. Cl.
*H04N 5/63* (2006.01)
*H01Q 1/24* (2006.01)
*H01R 31/06* (2006.01)

(52) U.S. Cl.
CPC ............ *H04N 5/63* (2013.01); *H01Q 1/24* (2013.01); *H01R 31/06* (2013.01)

(58) Field of Classification Search
CPC .. H04N 3/18; H04N 5/63; H04N 5/44; H04N 5/4401; G09G 2330/021; H01Q 1/24; H01R 31/06

(Continued)

(56) References Cited

U.S. PATENT DOCUMENTS

2013/0182190 A1* 7/2013 McCartney ............ H04N 5/63
                                                        348/730
2016/0232832 A1* 8/2016 Kang .................... G09G 3/2081

FOREIGN PATENT DOCUMENTS

EP    3 203 245        8/2017
JP    2017-511679      4/2017
(Continued)

OTHER PUBLICATIONS

International Search Report for PCT/KR2018/013742 dated Mar. 14, 2019, 4 pages.
(Continued)

*Primary Examiner* — Sherrie Hsia
(74) *Attorney, Agent, or Firm* — Nixon & Vanderhye, P.C.

(57) ABSTRACT

A display device is provided. The display device includes an adaptor including a low voltage part configured to output a first voltage converted from an AC power and a high voltage part configured to output a second voltage higher than the first voltage; an adaptor connector configured to detachably connect the adaptor thereto via a cable and to connect thereto a ground terminal of the low voltage part and a ground terminal of the high voltage part to be insulated from each other; a mainboard including a processor configured to operate by receiving the first voltage from the low voltage part via the adaptor connector; a power circuit configured to receive the second voltage from the high voltage part via the adaptor connector and including a ground terminal separated from a ground terminal of the mainboard; and a display configured to operate according to a voltage output form the power circuit to display an image under a control of the processor.

15 Claims, 7 Drawing Sheets

(58) Field of Classification Search
USPC .................. 348/730, 725; 345/211, 212, 52;
455/13.4, 522, 572, 127.1, 270, 298, 299,
455/343.6
See application file for complete search history.

(56) References Cited

FOREIGN PATENT DOCUMENTS

| KR | 10-2009-0070078 | 7/2009 |
| KR | 10-1022655 | 3/2011 |
| KR | 10-1037560 | 5/2011 |
| KR | 10-2012-0140305 | 12/2012 |
| KR | 10-1427592 | 8/2014 |

OTHER PUBLICATIONS

Written Opinion of the Isa for PCT/KR2018/013742 dated Mar. 14, 2019, 4 pages.

* cited by examiner

DISPLAY DEVICE

This application is the U.S. national phase of International Application No. PCT/KR2018/013742 filed Nov. 12, 2018 which designated the U.S. and claims priority to KR Patent Application No. 10-2017-0150642 filed Nov. 13, 2017, the entire contents of each of which are hereby incorporated by reference.

TECHNICAL FIELD

Apparatuses consistent with embodiments relate to a display device, and more particularly, a display device, which prevents an electric shock accident from being caused by a voltage output from a high voltage adaptor.

BACKGROUND ART

In a television (TV) using an existing adaptor, the adaptor converts an alternating current power of 90V to 230V into 12V to 24V to supply a power required to the TV via a cable. A switching mode power supply (SMPS) of the TV receives the power supplied from the adaptor and thus drive a mainboard and a light emitting diode back light unit (LED BLU).

In recent years, as a large screen TV of more than 55 inches is used, a high voltage adaptor having an output voltage more than 30V comes to be used as necessity instead of the existing adaptor of which the output voltage is less than 30V.

However, if the adaptor is used while the output voltage thereof is increased above 30V, there is a risk that users may be electrically shocked by the high voltage or exposed to a secondary accident due to a cable damage by squashing, denting or the like.

Also, if the adaptor is used so that an output connector thereof is repeatedly detached and/or attached, there is a problem that the output connector may be damaged or cause a fire due to a spark generated between the adaptor and the SMPS.

DISCLOSURE

Technical Problem

Embodiments provide a display device, which prevents an electric shock accident from being caused by a high voltage output, as in a television (TV) using a high voltage adaptor.

Also, the embodiments provide a display device, which prevents a spark from being generated when detaching or attaching a high voltage adaptor, as in a TV using the high voltage adaptor.

Technical Solution

According to an embodiment, a display device includes: an adaptor including a low voltage part configured to output a first voltage converted from an alternating current (AC) power and a high voltage part configured to output a second voltage higher than the first voltage; an adaptor connector configured to detachably connect the adaptor thereto via a cable and to connect thereto a ground terminal of the low voltage part and a ground terminal of the high voltage part to be insulated from each other; a mainboard including a processor configured to operate by receiving the first voltage from the low voltage part via the adaptor connector; a power circuit configured to receive the second voltage from the high voltage part via the adaptor connector and including a ground terminal separated from a ground terminal of the mainboard; and a display configured to operate according to a voltage output form the power circuit to display an image under a control of the processor.

With this, the display device may prevent an electric shock accident from being caused by a high voltage output, as in a television (TV) using the high voltage adaptor.

The display device may further include an antenna connector configured to detachably connect an antenna for receiving a broadcast signal thereto and to be connected with the ground terminal of the mainboard. Accordingly, even though the antenna of the display device, such as the TV, is connected with the ground of the mainboard, the display device may prevent the electric shock accident from being caused by the high voltage output.

The mainboard may be configured to mount thereon the antenna connector and at least one element configured to operate based on the voltage output from the power circuit. Accordingly, when the antenna is connected to the display device, such as the TV, the display device may prevent the electric shock hazard from being generated as the ground of the mainboard and the large output adaptor are connected through the earth.

The adaptor connector may be configured to connect a cable line connected to the high voltage part with the power circuit and to connect a cable line connected to the low voltage part with the mainboard. Accordingly, the output terminals of the high voltage part and the low voltage part may be physically separated from each other, thereby preventing the ground of the mainboard and the large output adaptor from being connected when connecting the antenna.

The high voltage part may include a first capacitor and a first resistor, and the power circuit may include a second capacitor having a capacity larger than the first capacitor, a second resistor, and a diode. Accordingly, the display device using the high voltage adaptor, such as the TV, may prevent a spark from being generated by an electric potential difference between the adaptor and a switching mode power supply (SMPS) when detaching or attaching the cable.

The diode may be provided on a discharge path of a voltage charged in the second capacitor. Accordingly, when detaching or attaching the cable, which connects with the high voltage adaptor, the display device may prevent a current passing through the SMPS from being immediately discharged.

The high voltage part may include a first capacitor, a third capacitor, a first resistor and a first diode, the power circuit may include a second capacitor, a fourth capacitor, a second resistor, and a second diode, and the second capacitor may have a capacity larger than the first capacitor, the third capacitor and the fourth capacitor. Accordingly, the display device using the high voltage adaptor, such as the TV, may prevent the spark from being generated by the electric potential difference between the adaptor and the SMPS when detaching or attaching the cable.

The second diode may be provided on a discharge path of a voltage charged in the second capacitor. Accordingly, when detaching or detaching the cable, which connects with the high voltage adaptor, the display device may prevent the current passing through the SMPS from being immediately discharged.

Based on an output voltage of the high voltage part being larger than an input voltage of the power circuit, a voltage charged in the first capacitor and the third capacitor may be used to charge the second capacitor and the fourth capacitor. Accordingly, when the high voltage adaptor is used, only low energy may be charged in the large capacity capacitors of the SMPS, thereby preventing the spark from being generated.

Based on an output voltage of the high voltage part being smaller than an input voltage of the power circuit, the first diode may be turned off to use a voltage charged in the second capacitor and the fourth capacitor to charge the third capacitor. Accordingly, when detaching or attaching the cable, which connects with the high voltage adaptor, the small capacity capacitors of the adaptor may be charged with energy stored in the large capacity capacitors of the SMPS, thereby preventing the spark from being generated.

The adaptor may further include a port flow control (PFC) circuit configured to rectify the input AC power to convert an AC voltage into a direct current (DC) voltage and to smooth the converted DC voltage. Accordingly, the display device may reduce an electronic wave and a loss in electricity, which are generated in the process of converting the AC Power into the DC.

According to an embodiment, a display device includes: an adaptor connector configured to detachably connect an adaptor thereto via a cable, the adaptor including a low voltage part configured to output a first voltage converted from an AC power and a high voltage part configured to output a second voltage higher than the first voltage, and to connect thereto a ground terminal of the low voltage part and a ground terminal of the high voltage part to be insulated from each other; a mainboard including a processor configured to operate by receiving the first voltage from the low voltage part via the adaptor connector; a power circuit configured to receive the second voltage from the high voltage part via the adaptor connector and including a ground terminal separated from a ground terminal of the mainboard; and a display configured to operate according to a voltage output form the power circuit to display an image under a control of the processor. With this, the display device may prevent an electric shock accident from being caused by a high voltage output, as in a TV using the high voltage adaptor.

The display device may further include an antenna connector configured to detachably connect an antenna for receiving a broadcast signal thereto and to be connected with the ground terminal of the mainboard. Accordingly, even though the antenna of the display device, such as the TV, is connected with the ground of the mainboard, the display device may prevent the electric shock accident from being caused by the high voltage output.

The mainboard may be configured to mount thereon the antenna connector and at least one element configured to operate based on the voltage output from the power circuit. Accordingly, when the antenna is connected to the display device, such as the TV, the display device may prevent the electric shock hazard from being generated as the ground of the mainboard and the large output adaptor are connected through an earth.

The adaptor connector may be configured to connect a cable line connected to the high voltage part with the power circuit and to connect a cable line connected to the low voltage part with the mainboard. Accordingly, the output terminals of the high voltage part and the low voltage part may be physically separated from each other, thereby preventing the ground of the mainboard and the large output adaptor from being connected when connecting the antenna.

The power circuit may include a second capacitor having a capacity larger than a first capacitor provided in the high voltage part, a second resistor, and a diode. Accordingly, the display device using the high voltage adaptor, such as the TV, may prevent a spark from being generated by an electric potential difference between the adaptor and the SMPS when detaching or attaching the cable.

The diode may be provided on a discharge path of a voltage charged in the second capacitor. Accordingly, when detaching or attaching the cable, which connects with the high voltage adaptor, the display device may prevent a current passing through the SMPS from being immediately discharged.

The power circuit may include a second capacitor, a fourth capacitor, a second resistor, and a second diode, and the second capacitor may have a capacity larger than the fourth capacitor and a first capacitor and a third capacitor provided in the high voltage part. Accordingly, the display device using the high voltage adaptor, such as the TV, may prevent the spark from being generated by the electric potential difference between the adaptor and the SMPS when detaching or attaching the cable.

The second diode may be provided on a discharge path of a voltage charged in the second capacitor. Accordingly, when detaching or attaching the cable, which connects with the high voltage adaptor, the display device may prevent the current passing through the SMPS from being immediately discharged.

Advantages Effects

As described above, according to the embodiments, the display device may prevent the electric shock accident from being caused by the high voltage output, as in the TV using the high voltage adaptor.

Also, according to the embodiments, the display device may prevent the spark from being generated when detaching or attaching the high voltage adaptor, as in the TV using the high voltage adaptor

BEST MODE

Below, embodiments will be described in detail by reference to accompanying drawings for those skilled in the art to work the present disclosure without difficulty. The embodiments may be achieved in various forms, and are not limited to the embodiments provided herein.

Figure 1:
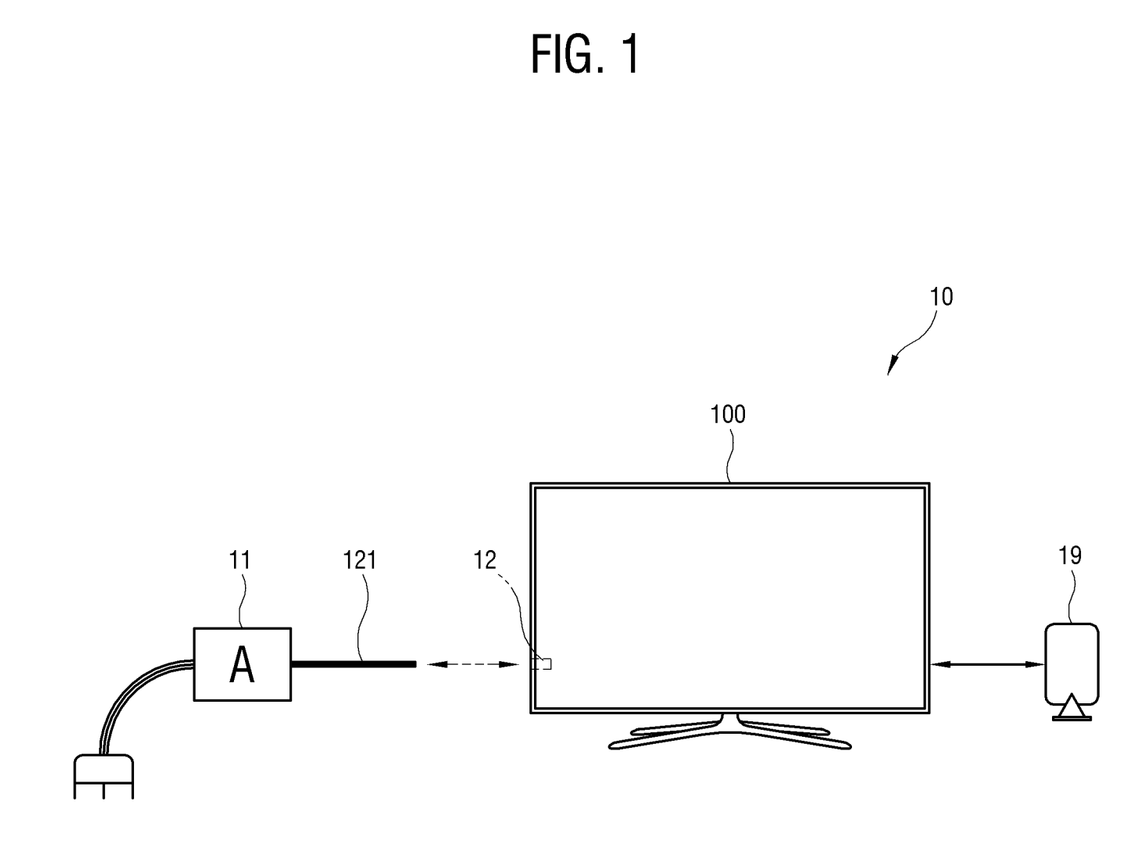
FIG. 1 is a schematic view showing a construction of a display device according to an embodiment.

FIG. 1 is a schematic view showing a construction of a display device according to an embodiment. As sown in FIG. 1, the display device 10 according to an embodiment consists of a main body 100, and an adaptor 11 connectable with the main body 100 via a cable 121. The main body 100 may be connected with an antenna 19.

To connect with the adaptor 11, the main body 100 of the display device 10 connects the cable 121 to an adaptor connector 12, and receives a voltage converted from an alternating current (AC) power via the cable 121 from the adaptor 11. Accordingly, the main body 100 uses the received voltage to supply a power required to operate all sorts of elements thereof.

The adaptor 11 is implemented as, for example, a high voltage adaptor having an output voltage more than 30V. At this time, the main body 100 may be implemented as a large screen of more than 55 inches.

The main body 100 is configured to separate a ground of a power circuit (referred to reference numeral 13 in FIG. 2) and a ground of a mainboard (referred to reference numeral 15 in FIG. 2), which are connected respectively to a high voltage part (referred to reference numeral 111 in FIG. 2) and a low voltage part (referred to reference numeral 112 in FIG. 2) of the adaptor 11, so that a ground of the high voltage part 111 and a ground of the low voltage part 112 are not connected via an earth when connecting the antenna 19 to the mainboard 15.

According to an embodiment as described above, since even though the antenna 11 is connected with the ground of the mainboard 15, the ground of the high voltage part 111 is separated from the ground of the mainboard 15, the display device 10 may prevent a user from being electrically shocked by a high output voltage.

Hereinafter, specific constructions of the display device 10 according to an embodiment will be described in detail with reference to FIGS. 2 and 3.

Figure 2:
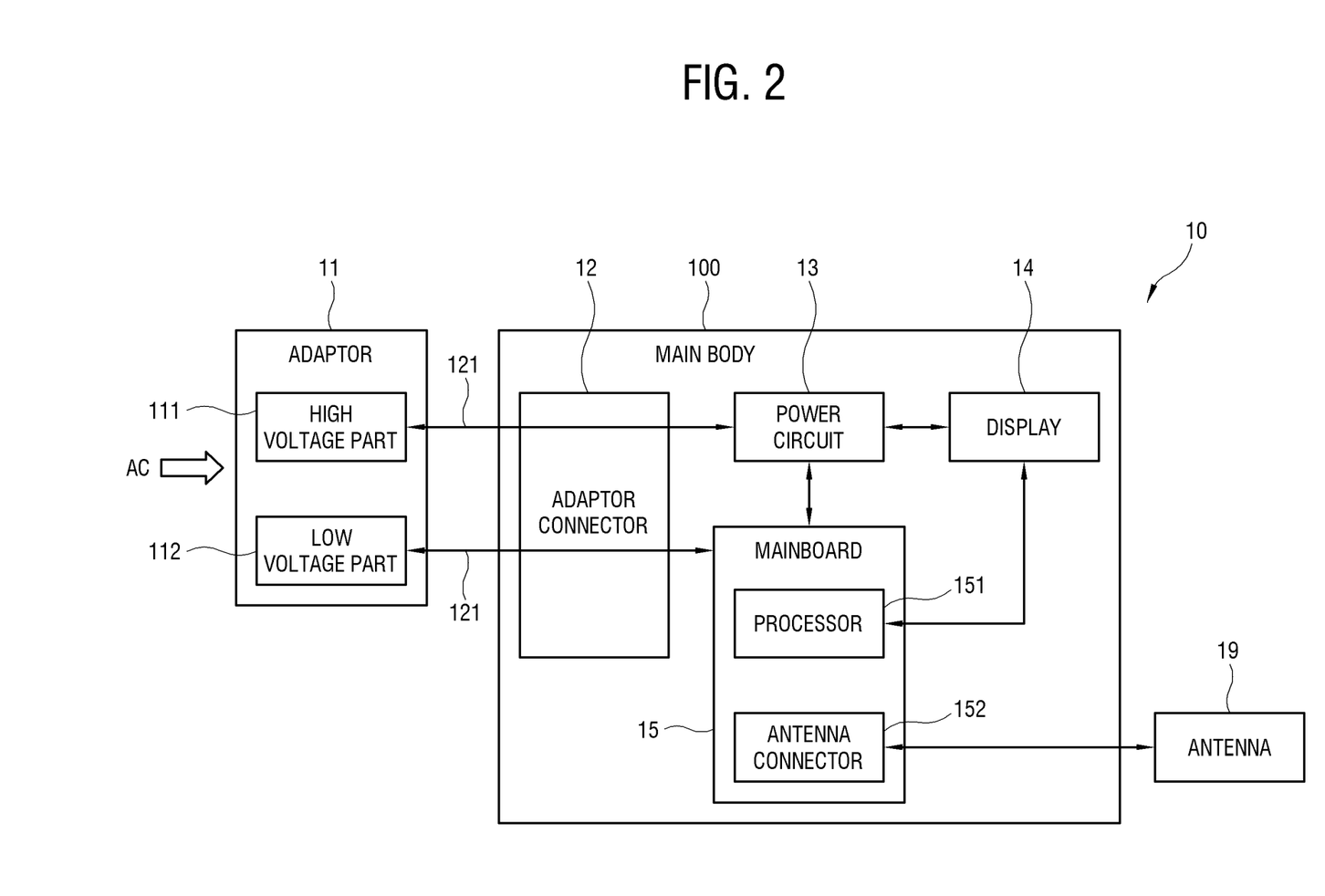
FIG. 2 is a block diagram showing the construction of the display device according to an embodiment.

FIG. 2 is a block diagram showing the construction of the display device according to an embodiment. As shown in FIG. 2, the display device according to an embodiment consists of the main body 100 and the adaptor 11. The main body 100 includes the adaptor connector 12, the power circuit 13, a display 14 and the mainboard 15. The adaptor 11 is connected to the adaptor connector 12 of the main body 100 via the cable 121. The mainboard 15 includes a processor 151 and an antenna connector 142. The antenna connector 142 is configured to detachably connect an antenna 19 for receiving a broadcast signal thereto and is connected with a ground terminal of the mainboard 15.

The display device 10 may be implemented as, for example, a television (TV). In the shown example, the display device 10 includes the construction of the adaptor 11, but may be implemented only by the construction of the main body 100 except for the adaptor 11. In this case, the adaptor 11 may be provided in a separate construction, which is connect with the display device 10.

The display device 10 according to an embodiment may use the constructions as described above thus to prevent an electrical shock accident from being caused by a user's cable contact when using the adaptor 11 of outputting the high voltage.

The adaptor 11 converts the input AC power to supply a power to the main body 100 of the display device 10 via the cable 121. The adaptor 11 includes the high voltage part 111 and the low voltage part 112, which convert the input AC power into voltages of levels different from each other.

The low voltage part 112 converts the AC power into a first voltage to output the first voltage, and the high voltage part 111 converts the AC power into a second voltage higher than the first voltage to output the second voltage. The high voltage part 111 may be implemented to output, for example, a voltage more than 100V and the low voltage part 112 may be implemented to output, for example, a voltage of about 13V.

To detach or attach the adaptor 11 through the cable 121, the adaptor connector 12 is provided on an outer surface of the main body 100. The adaptor connector 12 may be provided in a type, which is able to insert therein the cable 121 connecting the adaptor 11, and implemented in many different forms, such as a circle form identical to the cross section of the cable 121, a rectangular form including a circular connecting terminal therein, etc.

The adaptor connector 12 is connected with the adaptor 11, so that a ground terminal of the low voltage part 112 and a ground terminal of the high voltage part 111 of the adaptor 11 is insulated from each other. At this time, the cable 121, which connects the adaptor 11 and the adaptor connector 12, may be implemented in the form of binding lines connected respectively to positive and negative terminals of the high voltage part 111 and the low voltage part 112 together.

In the shown construction, the respective lines of the cable 121 connected to the high voltage part 111 and the low voltage part 112 are connected respectively to the power circuit 13 and the mainboard 15 via the adaptor connector 12.

The power circuit 13 receives the second voltage from the high voltage part 111 via the adaptor connector 12. The power circuit 13 outputs the second voltage received from the high voltage part 111 to the mainboard 15 to drive respective elements of the main body 100.

The mainboard 15 includes the processor 151, which controls operations for the respective elements of the main body 100. The processor 151 may be implemented as a central processing unit (CPU), and include three areas including a control area, a calculation area, and a register area. The control area interprets program command languages and instructs operations of respective elements in the display device 10 according to the meaning of the interpreted program command languages. The calculation area carries out an arithmetic operation and a logic operation, and carries out calculations required to operate the respective elements in the display device 10 according to the instructions of the control area. The register area, which is a memory location for storing information required while the CPU executes the command languages, stores command languages and data for the respective elements in the display device 10, and stores the calculation results.

The processor 151 operates receiving the first voltage from the low voltage part 112 via the adaptor connector 12. Here, the first voltage received from the low voltage part 112 is used as a standby power for operating the processor 151.

The display 14 displays an image processed based on an image signal received from an external. Implementation type of the display 14 is not limited and the display 14 may be implemented in various forms, such as plasma display panel (PDP), liquid crystal display (LCD), organic light emitting diodes (OLED), flexible display, etc.

The display 14 may be implemented as a large display of more than 55 inches. The display 14 is driven according to a voltage output from the power circuit 13, which receives the high output voltage from the high voltage part 111. The display 14 displays the image under a control of the processor 151.

In the shown construction according to an embodiment, the power circuit 13 has a ground terminal separated from a ground terminal of the main board 15. In other words, the power circuit 13, which receives the second voltage from the high voltage part 111, is separated from the mainboard 15, which receives the first voltage from the low voltage part 112, so that the ground terminals thereof are not connected to each other.

According to the construction as described above, since even though the antenna 11 is connected with the ground terminal of the mainboard 15 through the antenna connector 142, the ground terminal of the high voltage part 111 is separated from the ground terminal of the mainboard 15, the display device 10 may prevent the user from being electrically shocked by the high output voltage when the user contacts a damaged cable 121.

Figure 3:
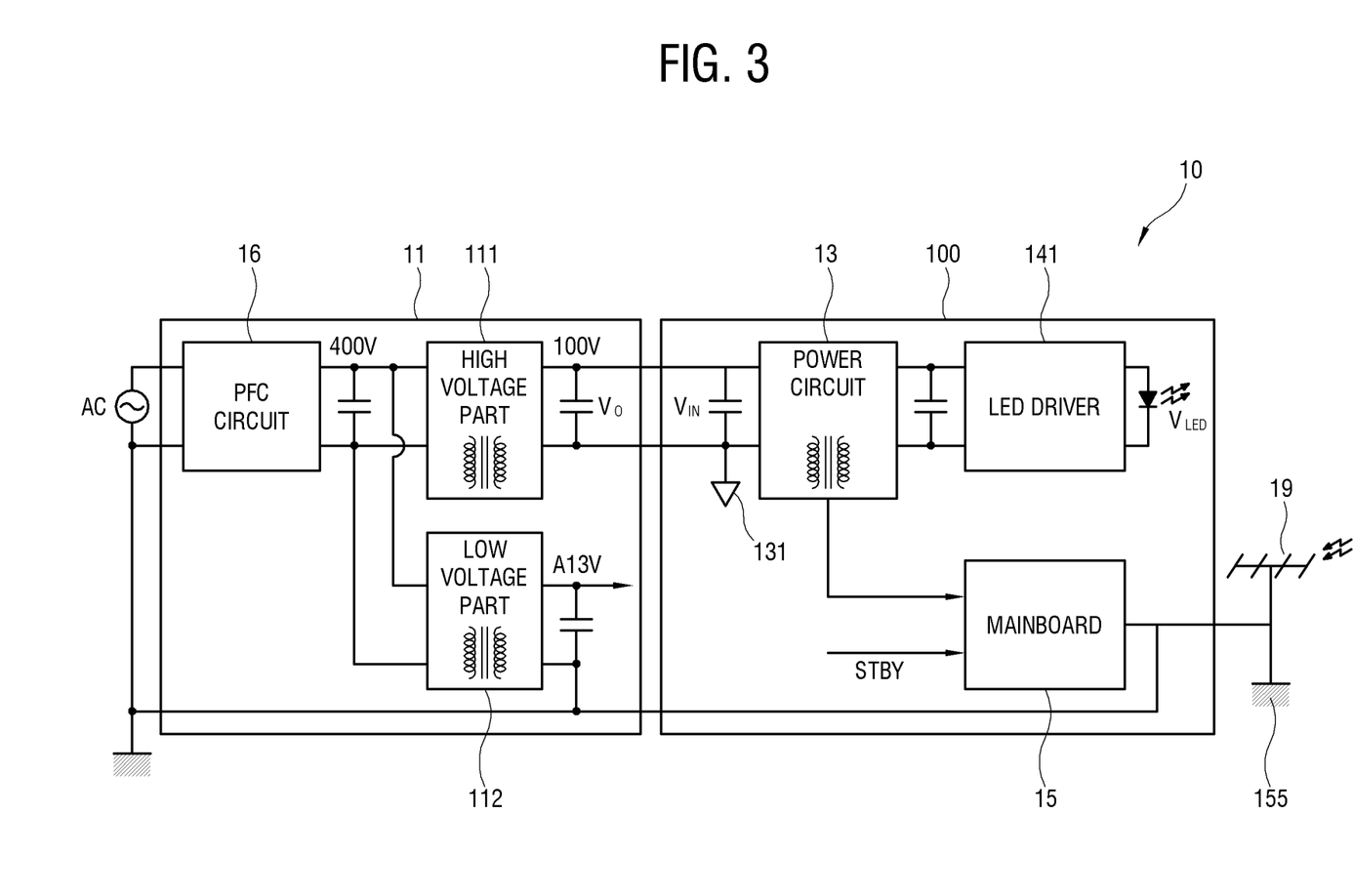
FIG. 3 is an example showing a circuit construction of the display device according to an embodiment.

FIG. 3 is an example showing a circuit construction of the display device according to an embodiment. As shown in FIG. 3, the display device 10 includes the adaptor 11 and the main body 100, and the adaptor 11 is detachably connected to the main body 100 through the cable 121.

The adaptor 11 includes a port flow control (PFC) circuit 16, the high voltage part 111 and the low voltage part 112. The PFC circuit 16 rectifies the input AC power to convert the AC voltage into the direct current (DC) voltage, and smooths the converted DC voltage. The PFC circuit 16 may include a smoothing capacitor (not shown) to smooth the converted DC voltage.

The PFC circuit 16 may further include an inductor (not shown), a diode (not shown), a pair of feedback resistors (not shown), a field effective transistor (FET) (not shown), and a PFC integrated circuit (IC) (not shown). The PFC IC switches the FET in a given frequency based on a voltage fed back by the feedback resistors to increase a voltage, which is charged in the smoothing capacitor.

The high voltage part 111 and the low voltage part 112 converts the voltage output from the PFC circuit 16 into given levels to output the converted voltages to the power circuit 13 and the mainboard 15, respectively.

To convert the voltage into the given levels, each of the high voltage part 111 and the low voltage part 112 incudes a primary coil and a secondary coil, i.e. two inductors, which do an induction action each other. Each of the high voltage part 111 and the low voltage part 112 may further include a FET (not shown) which is connected in series on the primary coil to control a current flow, a control IC (not shown) which switches the FET, a diode which is provided on the secondary coil to rectify an output voltage Vo, and a capacitor which maintains the output voltage Vo in the given level.

According to the construction as above, the high voltage part 111 outputs the second voltage converted from the AV power through the PFC circuit 16, and the low voltage part 112 outputs the first voltage converted from the AV power through the PFC circuit 16. For instance, the second voltage may be implemented as more than 100V, and the first voltage may be implemented as about 13V.

The power circuit 13 receives the second voltage output from the high voltage part 111 as an input voltage Vin, and converts the received second voltage into levels corresponding to the respective elements of the main body 100 using the two inductors, which do the induction action each other.

In other words, the power circuit 13 supplies voltages of levels different from each other converted as above to the mainboard 15, a light emitting diode (LED) driver 141, etc., to operate the respective elements of the main body normally.

On the other hand, the mainboard 15 receives the firs voltage output from the low voltage part 112 as the standby power, and controls the respective elements of the main body 100 to operate in a power standby state before they are normally operated.

In the shown construction, the positive terminal of the high voltage part 111 is connected with a positive terminal of the power circuit 13, and the positive terminal of the low voltage part 112 is connected with a positive terminal of the mainboard 15. The negative terminal of the high voltage part 111 is connected with a ground terminal 131 of the power circuit 13, and the negative terminal of the low voltage part 112 is connected with a ground terminal 155 of the mainboard 15.

Among the constriction descried above, the ground terminal 131 of the power circuit 13 is configured to be separated from the ground terminal 155 of the mainboard 15.

When the antenna 19 is connected to the ground terminal 155 of the mainboard 15 as an embodiment, if the ground terminal 131 of the power circuit 13 is connected with the ground terminal 155 of the mainboard 15, the negative terminal of the high voltage part 111 may be electrically connected with the negative terminal of the low voltage part 112 via an earth, thereby resulting in an electric shock accident.

However, in the constriction according to an embodiment, since the ground terminal 131 of the power circuit 13 is configured to be separated from the ground terminal 155 of the mainboard 15, even though the antenna 19 is connected to the ground terminal 155 of the mainboard 15, the negative terminal of the high voltage part 111 is not electrically connected with the negative terminal of the low voltage part 112.

Accordingly, using circuit constructions as described above, the display device may prevent the electrical shock accident from being caused by a user's contact to the cable 121 during the connection of the antenna 19 when using the adaptor 11 of the high voltage.

Figure 4:
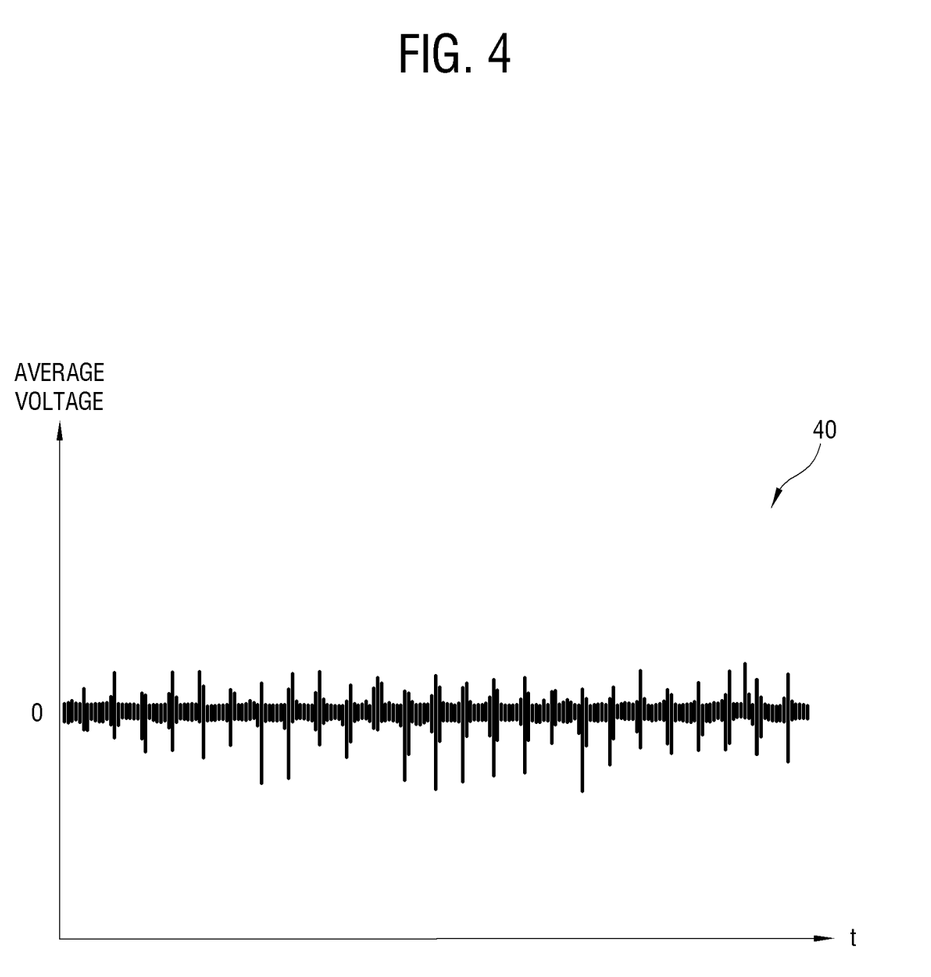
FIG. 4 is a graph showing a waveform of voltage measured at grounds of a mainboard and a high voltage part according to an embodiment.

FIG. 4 is a graph showing a waveform of voltage measured at the grounds of the mainboard and the high voltage part according to an embodiment. The shown example is a waveform of voltage measured respectively at the ground terminal 155 of the mainboard 15 and the ground terminal 131 of the power circuit 13 connected with the high voltage part 111.

In the shown graph 40, it may confirm that an average of voltage values measured respectively at the ground terminal 155 of the mainboard 15 and the ground terminal 131 of the power circuit 13 is 0V. In other words, since the ground terminal 131 of the power circuit 13 is configured to be separated from the ground terminal 155 of the mainboard 15, even though the antenna 19 is connected to the ground terminal 155 of the mainboard 15, the user may be prevented from being electrically shocked by the high voltage output from the high voltage part 111 due to the contact to the cable 121.

Figure 5:
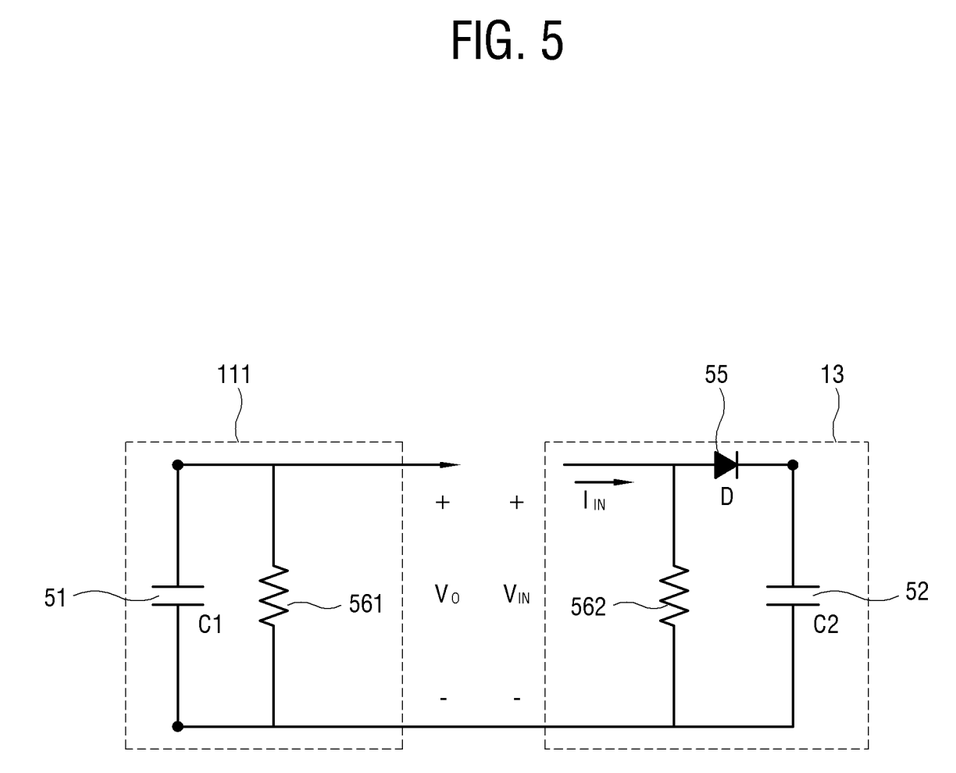
FIG. 5 is an example showing constructions of the high voltage part and a power circuit according to an embodiment.

FIG. 5 is an example showing constructions of the high voltage part and the power circuit according to an embodiment. With the circuit construction shown in FIG. 5, when detaching or attaching the cable 121, which connects the high voltage part 111 and the power circuit 13 each other, the display device 10 according to an embodiment may prevent a spark from being generated by an electric potential difference therebetween.

The high voltage part 111 includes a first capacitor 51, and a first resistor 561, and the power circuit 13 includes a second capacitor 52, a second resistor 562, and a diode 55. At this time, the second capacitor 52 has a capacity larger than the first capacitor 51.

The cable 121, which connect the high voltage part 111 and the power circuit 13 each other, may be often disconnected and then reconnected or vice versa for reasons, such as a user's carelessness, a faulty of connection terminals for connecting the cable 121, and the like.

In this case, generally, in the power circuit 13, a flowing current may be discharged right away, but in the high voltage part 111, not be discharged right away and remain therein, thereby generating the spark by the electric potential difference.

However, in the shown construction, if the cable 121 is disconnected, the high voltage part 111 discharges a current charged in the first capacitor 51 of small capacity right away by means of the first resistor 561 and the power circuit 13 is operated, so that a current charged in the second capacitor 52 of large capacity does not get out in a reverse direction by means of the diode 55 and an inputting current $I_{IN}$ is rapidly discharged by means of the second resistor 562.

Accordingly, if the cable 121 is in a connected state, energy is maintained in both the high voltage part 111 and the power circuit 13 and if the cable 121 is in a disconnected state, the current flowing in the high voltage part 111 is rapidly discharged, thereby preventing the spark from being generated.

Figure 6:
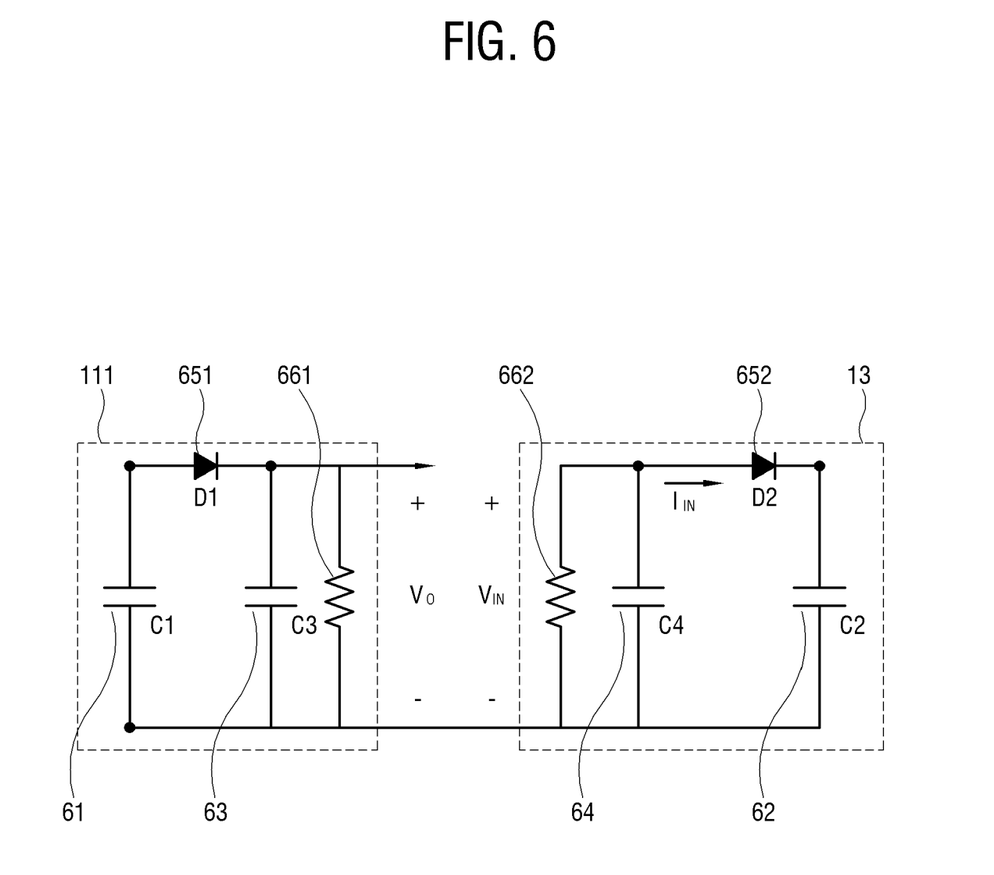
FIG. 6 is an example showing another constructions of the high voltage part and the power circuit according to an embodiment.

FIG. 6 is an example showing another constructions of the high voltage part and the power circuit according to an embodiment. In the circuit construction shown in FIG. 6, the high voltage part 111 includes a first capacitor 61, a third capacitor 63, a first resistor 661, and a first diode 651, and the power circuit 13 includes a second capacitor 62, a fourth capacitor 64, a second resistor 662, and a second diode 652. At this time, the second capacitor 62 has a capacity larger than the first capacitor 61, the third capacitor 63 and the fourth capacitor 64.

If the cable 121, which connects the high voltage part 111 and the power circuit 13 each other, is disconnected, the high voltage part 111 discharges a current charged in the third capacitor 63 of small capacity right away by means of the first resistor 661. However, if a current charged in the first capacitor 61 is quickly discharged, since circuit construction may be damaged, the current of the first capacitor 61 is slowly discharged by means of the first diode 651.

Also, if the cable 121 is disconnected, the power circuit 13 is operated, so that a current charged in the second capacitor 62 of large capacity does not get out in a reverse direction by means of the second diode 652 and a current charged in the fourth capacitor 64 is rapidly discharged by means of the second resistor 662.

To be more specific, as in three cases described below, by designing an output of the high voltage part 111 and an input of the power circuit 13 in small capacitances, rapid discharge may be achieved if the cable 121 is disconnected.

Firstly, if an output voltage Vo of the high voltage part 111 is larger than an input voltage $V_{IN}$ of the power circuit 13, the second capacitor 62 and the fourth capacitor 64 are charged with energy stored in the first capacitor 61 and the third capacitor 63. At this time, since a sum in capacity of the second capacitor 62 and the fourth capacitor 64 is larger than that of the first capacitor 61 and the third capacitor 63, only small energy is charged in the second capacitor 62 and the fourth capacitor 64, thereby preventing the spark from being generated.

Secondly, if the output voltage Vo of the high voltage part 111 is equal to the input voltage $V_{IN}$ of the power circuit 13, the electric potential difference does not occur, thereby preventing the spark from being generated.

Thirdly, if the output voltage Vo of the high voltage part 111 is smaller than to the input voltage $V_{IN}$ of the power circuit 13, the first diode 651 is turned off and thus only the third capacitor 63 of small capacity is charged with the energy stored in the second capacitor 62 and the fourth capacitor 64, thereby preventing the spark from being generated.

As described above, the display device 10 according to an embodiment is operated, so that if the cable 121 is in the connected state, energy is maintained in both the high voltage part 111 and the power circuit 13 and if the cable 121 is in the disconnected state, the current flowing in the high voltage part 111 is rapidly discharged, thereby preventing the spark from being generated.

Figure 7:
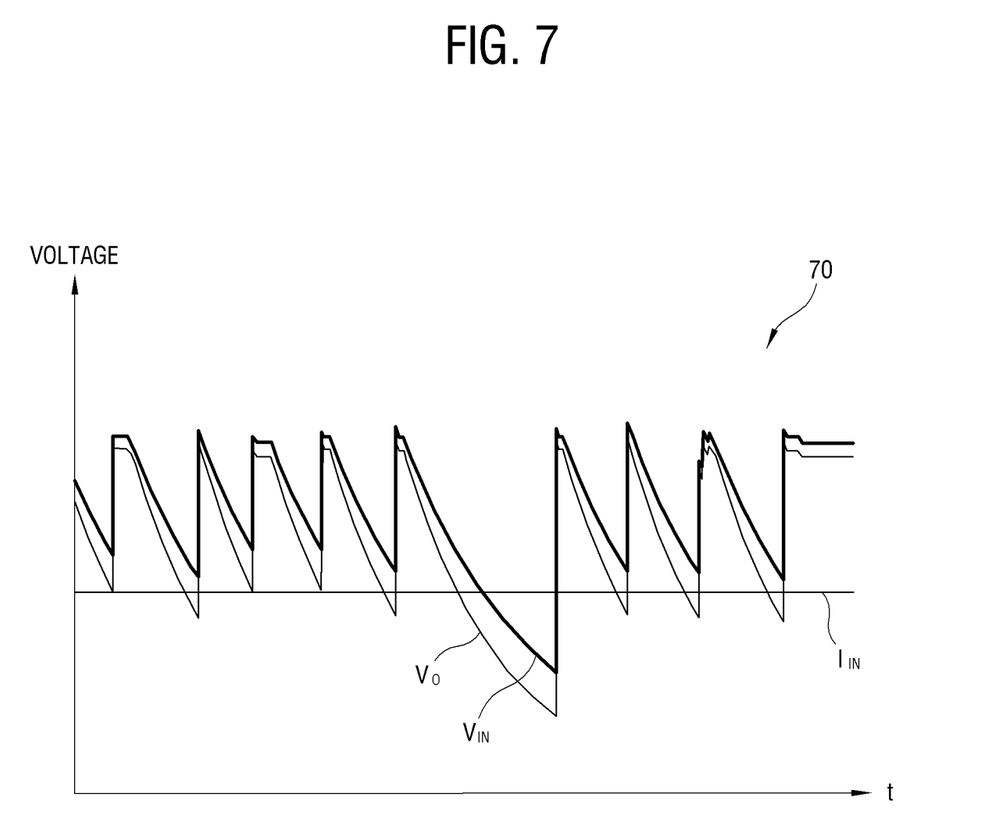
FIG. 7 is a graph showing waveforms of an output voltage of an adaptor and an input voltage of the power circuit when detaching and attaching a cable, according to an embodiment.

FIG. 7 is a graph showing waveforms of the output voltage of the adaptor and the input voltage of the power circuit when detaching and attaching the cable, according to an embodiment. The shown graph illustrtes the output voltage Vo of the high voltage part 111 and the input voltage $V_{IN}$ of the power circuit 13 when the cable 121 is disconnected.

In the circuit construction of FIG. 6, the sum in capacity of the second capacitor 62 and the fourth capacitor 64 is designed to be larger than that of the first capacitor 61 and the third capacitor 63.

As shown in the graph 70, if the cable 62 is disconnected, the output voltage Vo of the high voltage part 111 always comes to be smaller than the input voltage $V_{IN}$ of the power circuit 13.

In this case, the first diode 651 is turned off, and only the third capacitor 63 is charged only with the energy stored in the second capacitor 62, thereby preventing the spark from being generated.

As described above, although the present disclosure have been described with reference to the embodiments, it is not limited thereto, and may be actualized in many different forms within the appended claims and their equivalents.

The invention claimed is:

1. A display device comprising:
an adaptor comprising a low voltage part configured to output a first voltage converted from an alternating current (AC) power and a high voltage part configured to output a second voltage higher than the first voltage;
an adaptor connector configured to detachably connect the adaptor thereto via a cable and to connect thereto a ground terminal of the low voltage part and a ground terminal of the high voltage part to be insulated from each other;
a mainboard comprising a processor configured to operate by receiving the first voltage from the low voltage part via the adaptor connector;
a power circuit configured to receive the second voltage from the high voltage part via the adaptor connector and comprising a ground terminal separated from a ground terminal of the mainboard; and
a display configured to operate according to a voltage output form the power circuit to display an image under a control of the processor.

2. The device according to claim 1, further comprising:
an antenna connector configured to detachably connect an antenna for receiving a broadcast signal thereto and to be connected with the ground terminal of the mainboard.

3. The device according to claim 2, wherein the mainboard is configured to mount thereon the antenna connector and at least one element configured to operate based on the voltage output from the power circuit.

4. The device according to claim 1, wherein the adaptor connector is configured to connect a cable line connected to the high voltage part with the power circuit and to connect a cable line connected to the low voltage part with the mainboard.

5. The device according to claim 1,
wherein the high voltage part comprises a first capacitor and a first resistor, and
wherein the power circuit comprises a second capacitor having a capacity larger than the first capacitor, a second resistor, and a diode.

6. The device according to claim 5, wherein the diode is provided on a discharge path of a voltage charged in the second capacitor.

7. The device according to claim 1,
wherein the high voltage part comprises a first capacitor, a third capacitor, a first resistor and a first diode,
wherein the power circuit comprises a second capacitor, a fourth capacitor, a second resistor, and a second diode,
wherein the second capacitor has a capacity larger than the first capacitor, the third capacitor and the fourth capacitor.

8. The device according to claim 7, wherein the second diode is provided on a discharge path of a voltage charged in the second capacitor.

9. The device according to claim 7, wherein based on an output voltage of the high voltage part being larger than an input voltage of the power circuit, a voltage charged in the first capacitor and the third capacitor is used to charge the second capacitor and the fourth capacitor.

10. The device according to claim 7, wherein based on an output voltage of the high voltage part being smaller than an input voltage of the power circuit, the first diode is turned off to use a voltage charged in the second capacitor and the fourth capacitor to charge the third capacitor.

11. The device according to claim 1, wherein the adaptor further comprises a port flow control (PFC) circuit configured to rectify the input AC power to convert an AC voltage into a direct current (DC) voltage and to smooth the converted DC voltage.

12. A display device comprising:
an adaptor connector configured to detachably connect an adaptor thereto via a cable, the adaptor comprising a low voltage part configured to output a first voltage converted from an alternating current (AC) power and a high voltage part configured to output a second voltage higher than the first voltage, and to connect thereto a ground terminal of the low voltage part and a ground terminal of the high voltage part to be insulated from each other;
a mainboard comprising a processor configured to operate by receiving the first voltage from the low voltage part via the adaptor connector;
a power circuit configured to receive the second voltage from the high voltage part via the adaptor connector and comprising a ground terminal separated from a ground terminal of the mainboard; and
a display configured to operate according to a voltage output form the power circuit to display an image under a control of the processor.

13. The device according to claim 12, further comprising:
an antenna connector configured to detachably connect an antenna for receiving a broadcast signal thereto and to be connected with the ground terminal of the mainboard.

14. The device according to claim 13, wherein the mainboard is configured to mount thereon the antenna connector and at least one element configured to operate based on the voltage output from the power circuit.

15. The device according to claim 12, wherein the adaptor connector is configured to connect a cable line connected to the high voltage part with the power circuit and to connect a cable line connected to the low voltage part with the mainboard.

\* \* \* \* \*